(12) United States Patent
Won et al.

(10) Patent No.: US 6,193,302 B1
(45) Date of Patent: Feb. 27, 2001

(54) MOTOR VEHICLE INCLUDING A DEPLOYABLE SPOILER

(75) Inventors: Steve Won, Rochester, MI (US); John M. Dunkle, Temple City, CA (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/222,562

(22) Filed: Dec. 29, 1998

(51) Int. Cl.$^7$ ................................................. B62D 37/02
(52) U.S. Cl. .............................. 296/180.1; 180/903
(58) Field of Search ........................ 296/180.1, 180.3, 296/180.5; 180/903

(56) References Cited

U.S. PATENT DOCUMENTS

| | | | |
|---|---|---|---|
| 4,887,681 | * 12/1989 | Durm et al. ................. | 296/180.5 X |
| 5,141,281 | * 8/1992 | Eger et al. .................. | 296/180.5 |
| 5,275,249 | * 1/1994 | Nelson ....................... | 296/180.3 X |
| 5,923,245 | * 7/1999 | Klatt et al. ................. | 296/180.1 X |

FOREIGN PATENT DOCUMENTS

| | | | |
|---|---|---|---|
| 3711-386 | * 10/1987 | (DE) | ................................. 296/180.5 |
| 298-205 | * 1/1989 | (EP) | ................................. 296/180.5 |
| 2624823 | * 10/1987 | (FR) | ................................. 296/180.1 |
| 6-247346 | * 9/1994 | (JP) | ................................. 296/180.5 |

OTHER PUBLICATIONS

Co–pending U.S. Ser. No. 60/070,360 entitled "Adjustable Aerodynamic System For A Motor Vehicle" filed Jan. 2, 1998.

* cited by examiner

*Primary Examiner*—D. Glenn Dayoan
*Assistant Examiner*—Jason Morrow
(74) *Attorney, Agent, or Firm*—Mark P. Calcaterra

(57) ABSTRACT

A motor vehicle includes a spoiler articulable between a stored position substantially flush with the body of the vehicle and a deployed position vertically spaced from the body of the vehicle. The aerodynamic member is interconnected to the body through first and second stanchions. The stanchions are oriented substantially vertical when the aerodynamic members in the deployed position and horizontal when the aerodynamic member is in the stored position. A drive arrangement moves the aerodynamic member between its stored position and its deployed position.

18 Claims, 4 Drawing Sheets

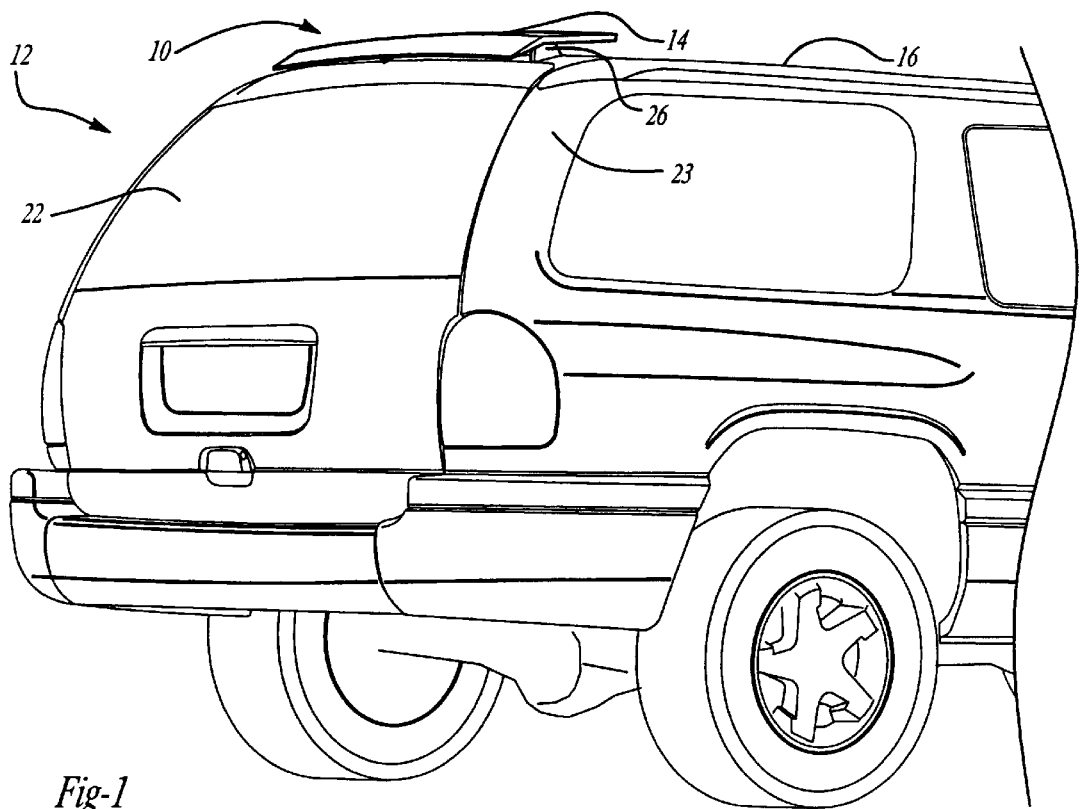
_Fig-1_
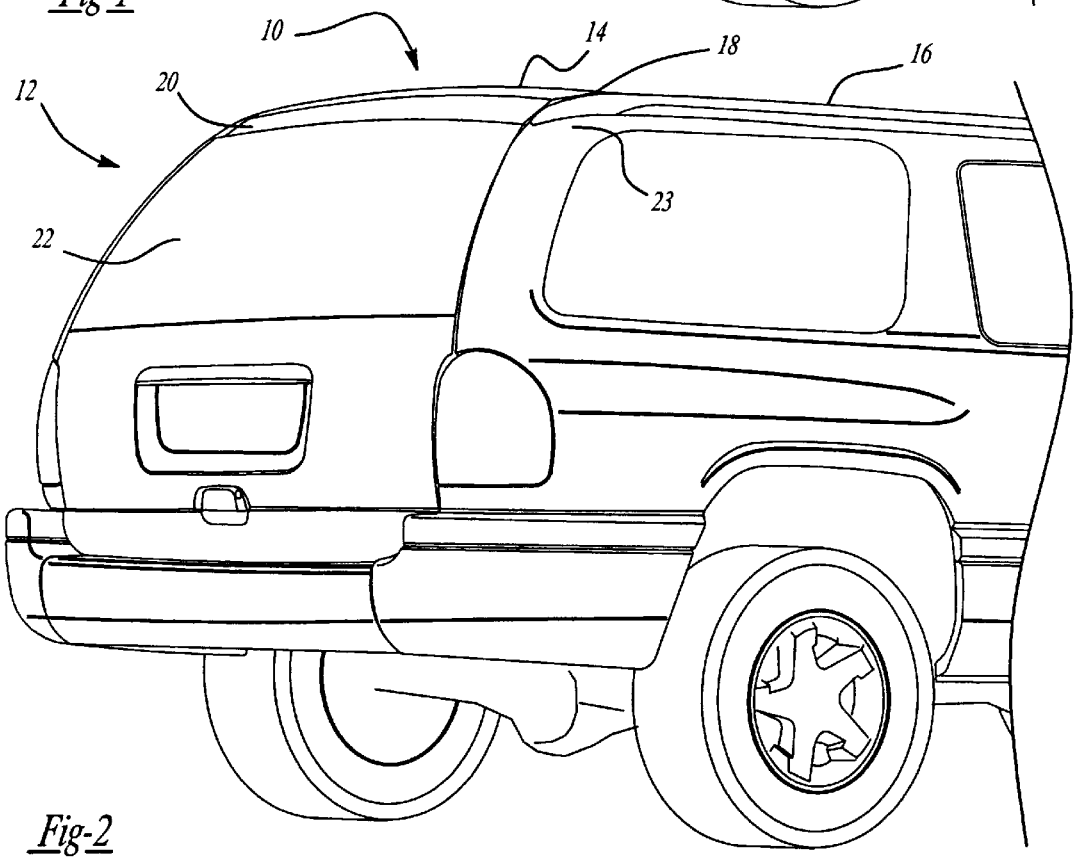
_Fig-2_

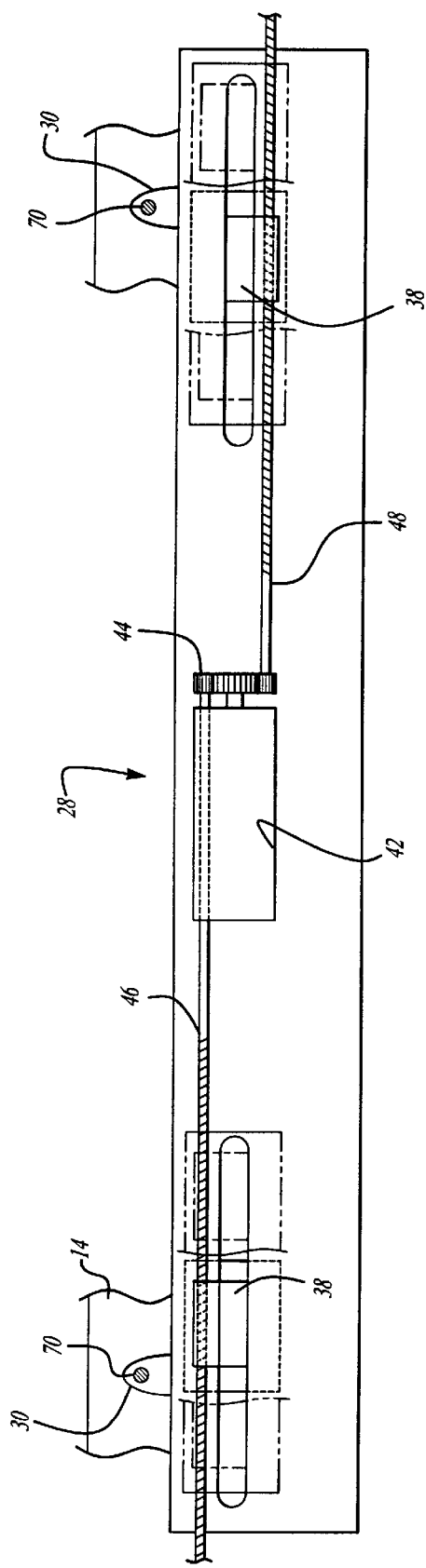
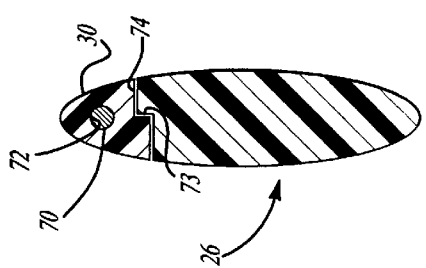
Fig-5
Fig-6

MOTOR VEHICLE INCLUDING A DEPLOYABLE SPOILER

BACKGROUND OF THE INVENTION

1. Technical Field

The present invention generally pertains to motor vehicles. More particular, the present invention pertains to an arrangement for reducing lift and drag of a motor vehicle. More specifically, but without restriction to the particular embodiment and/or use which is shown and described for pruposes of illustration, the present invention relates a spoiler for a motor vehicle which is articulable between a stored position and a deployed position.

2. Discussion

It is an ongoing goal of motor vehicle designers and engineers to reduce the aerodynamic drag over the vehicle and lift on the rear axle. Reducing aerodynamic drag and lift has the effect of increasing fuel efficiency or increasing speed for a given horsepower. The reduction of aerodynamic drag also improves handling characteristics of the motor vehicle. Even small improvements in fuel efficiency can reduce operating costs significantly.

Considerable effort has been initiated towards the incorporation of spoilers or air deflectors on motor vehicles for reducing aerodynamic drag and lift. As a result, widespread use of air deflectors for various vehicles has been previously contemplated. However, it is well known that the air deflectors are not required, and in fact are effectively non-functional, when the vehicle is stopped or the air deflector for particular vehicles may not always be desired. The need for reduced lift and drag of a motor vehicle exists in the form of a practical device which is retractable and does not substantially detract from the overall appearance of a vehicle.

SUMMARY OF THE INVENTION

It is a general object of the present invention to provide an improved arrangement for reducing the lift and drag of a motor vehicle.

It is another object of the present invention to provide a motor vehicle having a spoiler which may be articulated between a stored position and a deployed position.

In one form, the present invention provides a motor vehicle including a body and a transversely extending aerodynamic member. A pair of stanchions interconnects the body of the motor vehicle and the aerodynamic member. The aerodynamic member is articulable between a deployed position and a stored position. In the deployed position, the aerodynamic member is vertically spaced from the body of the motor vehicle. In the stored position, the aerodynamic member is oriented substantially flushed with the body.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

Other features and advantages of the invention will be evident from the following detailed description of the preferred embodiment of the invention and the accompany drawings wherein:

FIG. 1 is a rear perspective view of a portion of a motor vehicle constructed in accordance with the teachings of the preferred embodiment of the present invention to include a deployable rear spoiler, the rear spoiler shown articulated to its deployed position.

FIG. 2 is a rear perspective view similar to FIG. 1, illustrating the deployable rear spoiler articulated to its retracted or stored position.

FIG. 5 is a is a simplified bottom view of the drive mechanism for moving the deployable rear spoiler of the present invention between its deployed position and its lowered position.

FIG. 6 is a cross-sectional view taken through one of the stanchions and an associated guide member.

DETAILED DESCRIPTION OF THE PREFERRED EMBODIMENT

Figure 3:
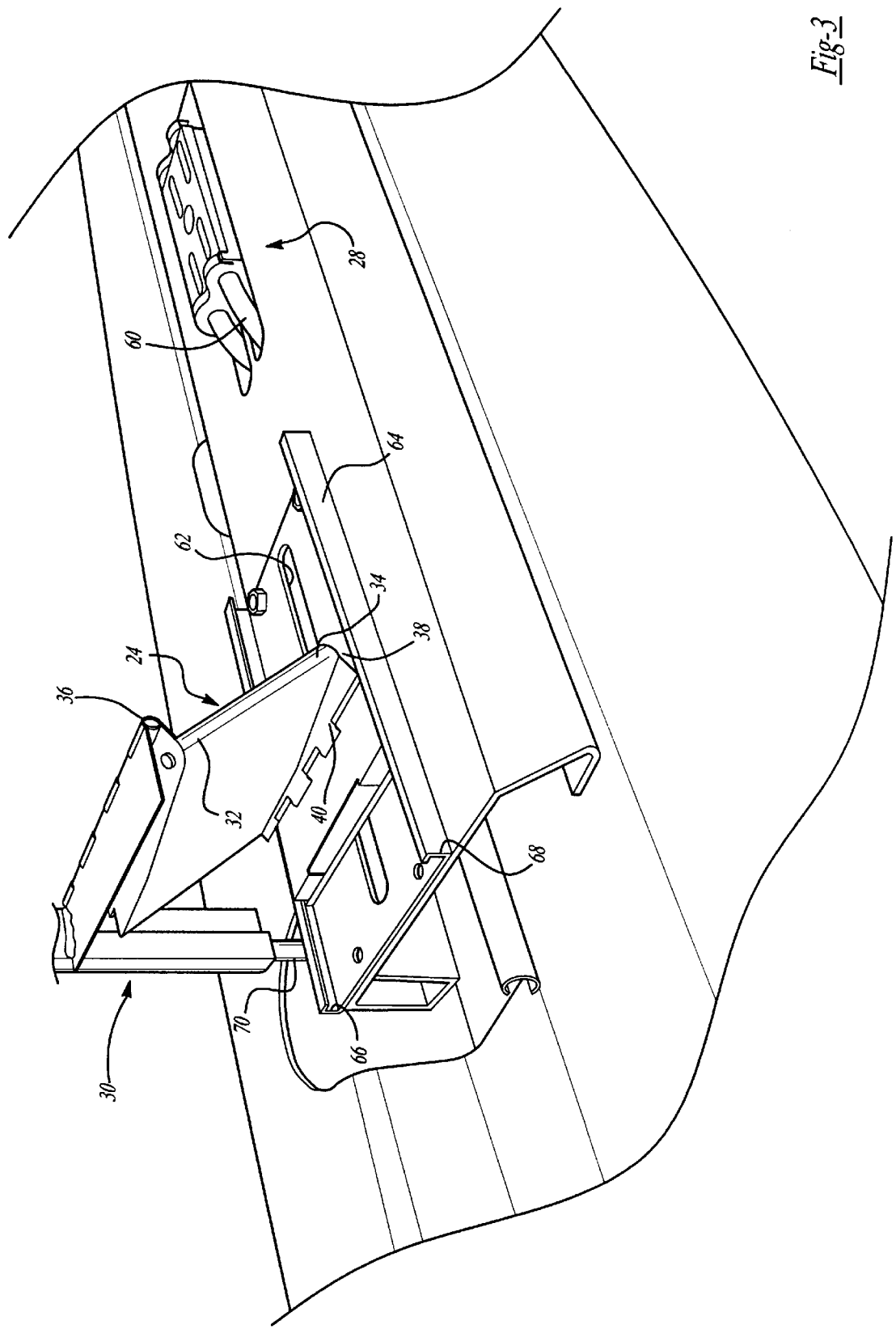
FIG. 3 is a perspective view a portion of the motor vehicle of FIG. 1 with an upper aerodynamic member of the spoiler removed for purposes of illustration.

With initial reference to FIGS. 1 and 2, a deployable spoiler constructed in accordance with the teachings of the preferred embodiment of the present invention is generally identified at reference numeral 10. The spoiler 10 is shown operatively associated with a portion of an exemplary motor vehicle 12 and extending substantially across the vehicle 12 laterally. The exemplary motor vehicle 12 is illustrated as a sport utility vehicle. However, it will be understood that the teachings of the present invention have applicability to other types of vehicles.

As will become more apparent below, the spoiler 10 is articulable between a stored position and a deployed position. The deployed position, in which an aerodynamic member 14 of the spoiler 10 is vertically displaced from a roof 16 of the vehicle 12, is shown in FIG. 1. The stored or retracted deployed position is shown in FIG. 2 with the aerodynamic member 14 substantially flush with the roof 16 of the vehicle 12. In the stored position, the aerodynamic member 14 is shown to include a first portion 18 oriented substantially flush with the roof 16 and a second portion 20 oriented substantially flush with a rear liftgate 22 of the motor vehicle 12.

Figure 4:
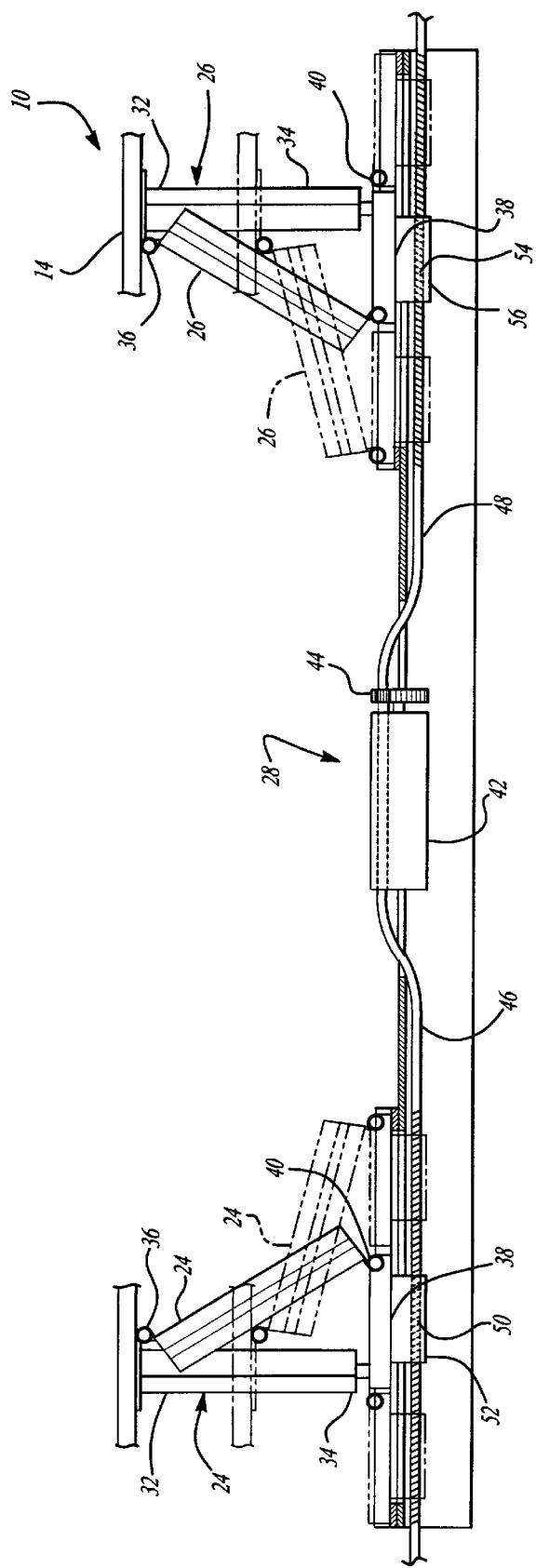
FIG. 4 is a simplified rear view of the drive mechanism for moving the deployable rear spoiler of the present invention between its deployed position and its lowered position.

With continued reference to FIGS. 1 and 2 and additional reference to FIGS. 4 through 6, the present invention is illustrated to include first and second stanchions which interconnect the aerodynamic member 14 with a body 23 of the motor vehicle 12. The present invention further includes a drive arrangement 28 for articulating the aerodynamic member 14 between its deployed and stored position under a source of power.

Each of the stanchions 24 and 26 is associated with a guide member 30. It will be understood that the first and second stanchions 24 and 26 and their associated guide members 30 are mirror images of one another about a longitudinal centerline of the motor vehicle. For this reasons, common features will be identified throughout the drawings with identical reference numbers.

Both of the stanchions 24 and 26 include an upper end 32 and a lower end 34. The upper ends 32 are pivotally interconnected to the aerodynamic member 14 for relative movement about a longitudinally extending pivot axis. In the exemplary embodiment illustrated, the upper ends 32 are pivotally attached to the aerodynamic member 14 through a piano hinge 36. The lower ends 34 of the stanchions 24 and 26 are pivotally interconnected to the body 23 of the motor vehicle 12 for rotation about a longitudinally extending pivot axis. Pivotal attachment of the lower ends 34 is through a mounting member 38. In the exemplary embodiment, the lower ends 34 are attached to the mounting members 38 through a piano hinge 40.

The drive arrangement 28 of the present invention is illustrated to include a drive motor 42 for driving a drive gear 44. The drive gear 44 is meshingly engaged with first and second worm gears or elongated threaded members 46 and 48. In the exemplary embodiment illustrated, the elongated threaded members 46 and 48 are flexible. The first threaded member 46 extends through an internally threaded aperture 50 of a downwardly extending portion 52 of the mounting member 38 associated with the first stanchion 24. In a similar manner, the second threaded members 48 extends through an internally threaded aperture 54 of a downwardly extending member 56 of the mounting member 38 associated with the second stanchion 26. In the exemplary embodiment, the first and second threaded members 46 and 48 are housed within metal tubing 60.

The downwardly extending portions 50 and 54 of the mounting members 38 extend through an elongated aperture 62 provided in a guide member 30. The longitudinal extending aperture 62 accommodates lateral translation of the mounting member 38. The guide plate 64 defines a pair of spaced apart channels 66 and 68 which limits longitudinal displacement of the mounting member 38 as it is translated laterally.

The first and second threaded members 46 and 48 are threaded in opposite directions. As such, when the motor 42 drives the driven gear 44 in a first direction, the mounting members 38 are drawn towards one another. Conversely, rotation of the driven gear 44 in the opposite direction causes the mounting members 38 to be outwardly displaced. The stanchions 24 and 26 are oriented substantially vertical when the aerodynamic member 14 is in its deployed position. Rotation of the driven gear 44 in the first direction thus causes the stanchions 24 and 26 to outwardly pivot about their lower ends 34 and thereby linearly translate the aerodynamic member 14 downwardly. When the aerodynamic member 14 is in its stored position, the stanchions 24 and 26 are oriented substantially horizontal.

The guide members 30 associated with the first and second stanchions 24 and 26 are fixedly attached to the aerodynamic member 14 and downwardly extend from the aerodynamic member 14. The guide members are mounted on guide rods 70 secured to the body 23. The guide rods 70 are received within vertically extending apertures 72 provided in the guide members 30. As shown most clearly in the cross-sectional view of FIG. 6, the guide members 30 include a stepped surface 73 which mates with a complimentary stepped surface 74 carried by the associated stanchion 24 and 26.

In the exemplary embodiment illustrated, the drive motor 42 of the drive arrangement 28 is controlled by a switch (not shown) located in the passenger compartment of the vehicle 12. The drive motor 42 may also be actuated in a conventional manner with a remote control (not shown). Alternatively, it will be understood that the drive motor 42 may be automatically actuated in a conventional manner at a predetermined vehicle speed.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A motor vehicle comprising:
   a body;
   a transversely extending aerodynamic member;
   a pair of stanchions interconnecting said body and said aerodynamic member; and
   a pair of guide members downwardly extending from said aerodynamic member;
   said aerodynamic member movable between a deployed position in which said aerodynamic member is vertically spaced from said body and a stored position in which said aerodynamic member is substantially flush with said body;
   wherein both guide members of said pair of guide members include a stepped surface which mates with an associated one of said pair of stanchions when said aerodynamic member is in said deployed position.

2. The motor vehicle of claim 1, wherein said pair of stanchions are oriented substantially vertical when said aerodynamic member is in said deployed position and said pair of stanchions are oriented substantially horizontal when said aerodynamic member is in said stored position.

3. The motor vehicle of claim 1, wherein said aerodynamic member linearly translates in a vertical direction between said deployed position and said stored position.

4. The motor vehicle of claim 1, wherein each stanchion of said pair of stanchions includes an upper end pivotally attached to said aerodynamic member.

5. The motor vehicle of claim 1, wherein each stanchion of said pair of stanchions includes a lower end, said lower ends being movable in a horizontal direction as said aerodynamic member is moved between said deployed and stored position.

6. The motor vehicle of claim 1, further comprising a drive mechanism for driving said aerodynamic member between said deployed position and said stored position.

7. The motor vehicle of claim 1, wherein the motor vehicle includes a roof and a liftgate, and further wherein said aerodynamic member includes a first surface substantially flush with said roof and a second surface substantially flush with said liftgate when said aerodynamic member is in said stored position.

8. A motor vehicle comprising:
   a body;
   a transversely extending aerodynamic member;
   first and second stanchions interconnecting said body and said aerodynamic member; and
   first and second guide members fixedly attached to and downwardly extending from said aerodynamic member;
   said aerodynamic member movable between a deployed position in which said aerodynamic member is vertically spaced from said body and a stored position in which said aerodynamic member is substantially flush with said body;

wherein said first guide member and said first stanchion cooperate to define an elliptical cross section in a horizontal direction when said aerodynamic member is in said deployed position.

9. The motor vehicle of claim 8, further comprising first and second vertically oriented rods attached to said body and slidably received within first and second apertures provided in said first and second guide members, respectively.

10. The motor vehicle of claim 8, wherein said first and second stanchions are oriented substantially vertical when said aerodynamic member is in said deployed position and said first and second stanchions are substantially horizontal when said aerodynamic member is in said stored position.

11. The motor vehicle of claim 8, wherein said first and second stanchions each include an upper end pivotally attached to said aerodynamic member.

12. The motor vehicle of claim 8, where said first guide member includes a stepped surface which mates with said first stanchion when said aerodynamic member is in said deployed position.

13. The motor vehicle of claim 8, wherein the motor vehicle includes a roof and a liftgate, and further wherein said aerodynamic member includes a first surface substantially flush with said roof and a second surface substantially flush with said liftgate when said aerodynamic member is in said stored position.

14. A motor vehicle comprising:

a body;

a transversely extending aerodynamic member;

first and second stanchions interconnecting said body and said aerodynamic member; and a drive arrangement for moving said aerodynamic member between a stored position and a deployed position;

said aerodynamic member being vertically spaced from said body when in said deployed position;

said first and second stanchions being oriented substantially vertical when said aerodynamic member is in said deployed position and substantially horizontal when said aerodynamic member is in said stored position;

wherein a lower ends of said first and second stanchions move toward one another as said aerodynamic member is moved from said deployed position to said stored position.

15. The motor vehicle of claim 14, wherein said aerodynamic member linearly translates in a vertical direction between said deployed position and said stored position.

16. The motor vehicle of claim 14, wherein said first and second stanchions each include an upper end pivotally attached to said aerodynamic member.

17. The motor vehicle of claim 14, wherein said drive arrangement includes:

a drive motor;

a drive gear driven by said drive motor; and first and second elongated threaded members meshingly engaged with said drive gear, said first and second elongated threaded members being operatively engaged with said first and second stanchions, respectively.

18. The motor vehicle of claim 14, wherein the motor vehicle includes a roof and a liftgate, and further wherein said aerodynamic member includes a first surface substantially flush with said roof and a second surface substantially flush with said liftgate when said aerodynamic member is in said stored position.

* * * * *